US012649992B2

(12) United States Patent
Kardos et al.

(10) Patent No.: US 12,649,992 B2
(45) Date of Patent: Jun. 9, 2026

(54) NEAR-NET SHAPE SHORT FIBER REINFORCEMENT PREFORMS AND COMPOSITES

(71) Applicants: VOLKSWAGEN AKTIENGESELLSCHAFT, Wolfsburg (DE); University of Tennessee Research Foundation, Knoxville, TN (US)

(72) Inventors: Marton Gabor Kardos, Knoxville, TN (US); Hendrik Mainka, Athens, TN (US); David Harper, Maryville, TN (US)

(73) Assignees: VOLKSWAGEN AKTIENGESELLSCHAFT, Wolfsburg (DE); University of Tennessee Research Foundation, Knoxville, TN (US)

( * ) Notice: Subject to any disclaimer, the term of this patent is extended or adjusted under 35 U.S.C. 154(b) by 648 days.

(21) Appl. No.: 17/979,404

(22) Filed: Nov. 2, 2022

(65) Prior Publication Data

US 2024/0141594 A1    May 2, 2024

(51) Int. Cl.
| | |
|---|---|
| D21J 3/10 | (2006.01) |
| B33Y 80/00 | (2015.01) |
| D21J 1/06 | (2006.01) |
| D21J 1/12 | (2006.01) |
| D21J 7/00 | (2006.01) |

(52) U.S. Cl.
CPC ................. D21J 7/00 (2013.01); B33Y 80/00 (2014.12); D21J 1/06 (2013.01); D21J 1/12 (2013.01)

(58) Field of Classification Search
CPC ...................................... D21J 3/10; D21J 7/00
USPC ........................................................ 264/45.1
See application file for complete search history.

(56) References Cited

U.S. PATENT DOCUMENTS

| | | | | |
|---|---|---|---|---|
| 5,820,801 | A * | 10/1998 | Greve ........................ | D21J 3/10 |
| | | | | 425/84 |
| 7,306,834 | B2 | 12/2007 | Nonomura et al. | |
| 2021/0269983 | A1* | 9/2021 | Pierce ........................ | D21J 3/10 |
| 2022/0002951 | A1 | 1/2022 | Vandecruys | |
| 2022/0274343 | A1* | 9/2022 | Spooner ................ | B29C 66/919 |

* cited by examiner

*Primary Examiner* — Jacob T Minskey
(74) *Attorney, Agent, or Firm* — Shield Intellectual Property PC; Zhichong Gu

(57) ABSTRACT

Example approaches are disclosed for manufacturing composite or fiber reinforcement preforms. Liquid, fibrous, binding and potentially other materials are mixed into a composite mixture slurry in a slurry container. A porous tool having a specific porous outer surface portion approximating a specific exterior surface portion of a spatial shape of a final product is immersed in the slurry container. A suction pressure is applied to draw a portion of the fibrous material intermixed with a corresponding portion of the binding material in the slurry onto the specific outer surface portion. The porous tool attached with the wet preform is removed from the slurry container. The wet preform is partially dried into a partially dried preform attached to the porous tool. The partially dried preform is dried, solidified and/or consolidated and/or injected with a resin and cured into a solid composite preform of the spatial shape of the final product.

13 Claims, 6 Drawing Sheets

From FIG. 3

*FIG. 5A*

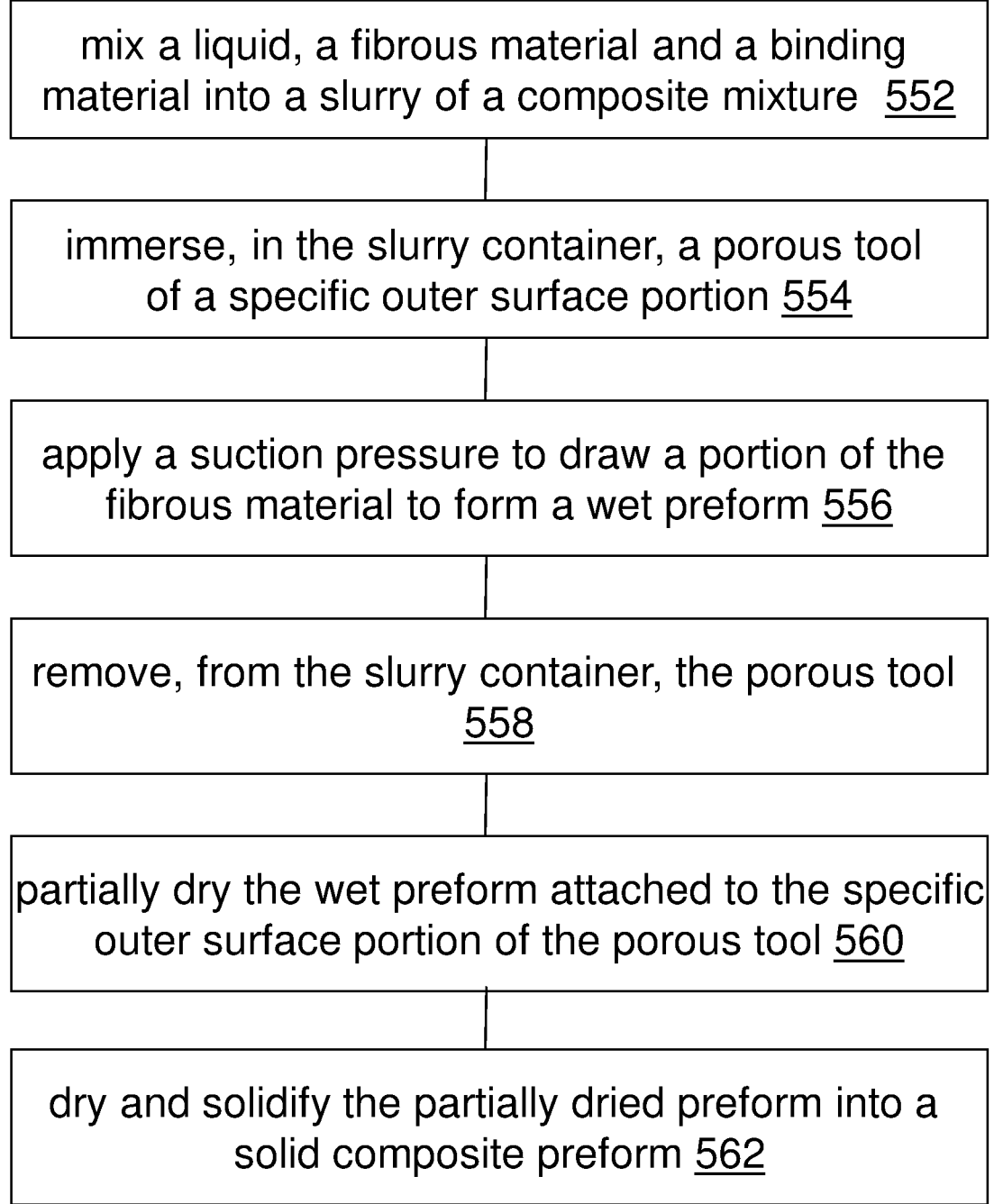

mix a liquid, a fibrous material and a binding material into a slurry of a composite mixture 552 immerse, in the slurry container, a porous tool of a specific outer surface portion 554 apply a suction pressure to draw a portion of the fibrous material to form a wet preform 556 remove, from the slurry container, the porous tool 558 partially dry the wet preform attached to the specific outer surface portion of the porous tool 560 dry and solidify the partially dried preform into a solid composite preform 562

*FIG. 5B*

NEAR-NET SHAPE SHORT FIBER REINFORCEMENT PREFORMS AND COMPOSITES

TECHNICAL FIELD

Embodiments relate generally to manufacturing processes, and, more specifically, to manufacturing processes for fiber reinforced composites.

BACKGROUND

A vehicle or many parts therein may be made of materials such as steel, aluminum, plastics, and to a lesser extent composite materials. Transforming these materials into final spatial forms (or net-shapes) to be used in the vehicle may take a number of manufacturing steps, generate much waste, and consume a significant amount of energy, time and labor.

Composite materials made of recycled materials may be used to make relatively flexible and light weight parts in vehicle or non-vehicle systems. These composite materials may come into the vehicle manufacturing process having an initial sheet form. Additional manufacturing steps are needed to transform the composite materials into relatively complex final spatial forms/geometries or net-shapes significantly different from the initial sheet form. These additional manufacturing steps are prone to generating much composite material waste such as cut-offs among other manufacturing issues. Therefore, there exists a need to generate new manufacturing processes for composite materials suitable for vehicle applications.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 2 illustrates example operations of drying or removing moisture/liquid from composite mixture preforms;

FIG. 5A and FIG. 5B illustrate example process flows for producing fiber-reinforced composite preforms.

DETAILED DESCRIPTION

Figure 1:
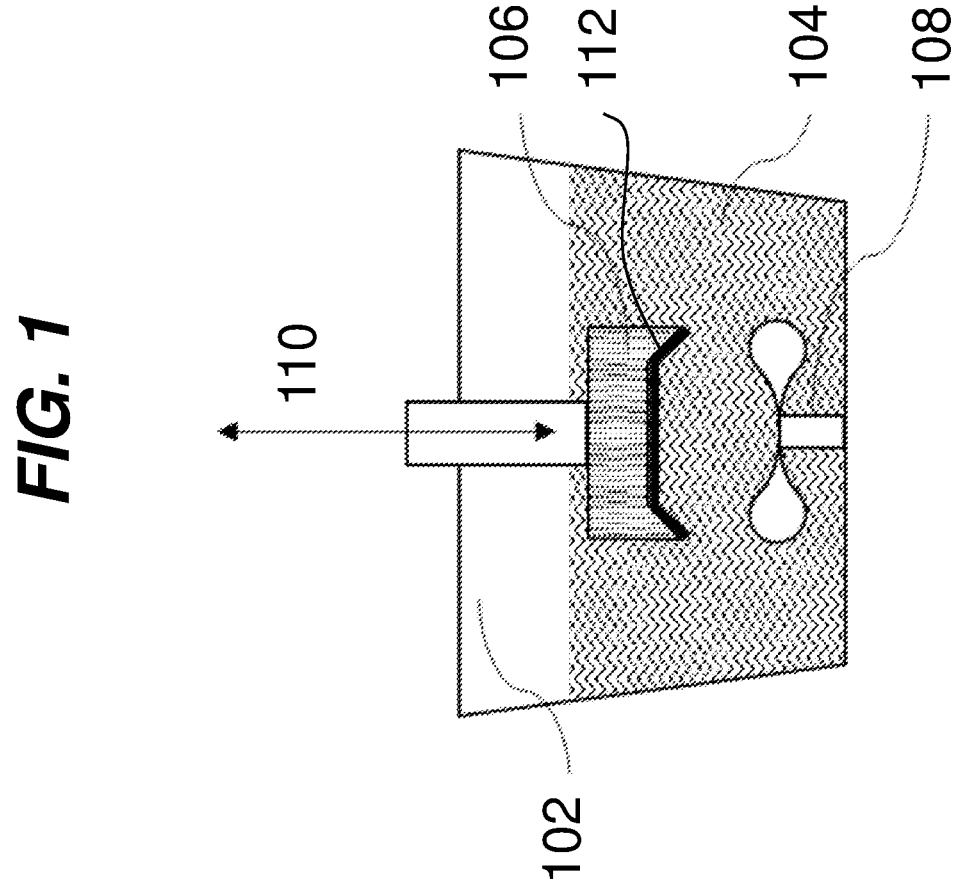
FIG. 1 illustrates example fiber mixing and preforming.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

Embodiments are described herein according to the following outline:

1.0. General Overview
2.0. Wet Composite Preform
3.0. Dry Composite Preform
4.0. Solidify Composite Preform
5.0. Example Embodiments
6.0. Extensions and Alternatives

1.0. General Overview

Manufacturing processes of fiber composite preforms typically do not support complex shapes due to drapability limitations of composite materials used as input by these processes. To get around these limitations, composite materials in a sheet form—which may be solid, flexible, generally planar when laying on a rigid planar surface, etc.—may be used as input to a vehicle or non-vehicle manufacturing process in which the composite materials in the sheet form are cut, shaped, bent or molded into complex shapes for final products. This incurs significant energy consumption and produces significant waste as cut-off.

In contrast, under techniques as described hereafter, slurry-based manufacturing processes of composite (mixture) preforms can be implemented to generate or produce wet preforms with near-net-shapes. These wet preforms may be further dried, molded or solidified into net-shapes of the final forms or final products with no or little additional shaping or forming operations. The final products made of the composite materials such as those containing natural fibers can be readily and efficiently incorporated into overall vehicle or non-vehicle systems. No or little composite material waste is generated under these techniques as compared with other manufacturing processes that do not implement the techniques as described herein.

As used herein, net-shapes of final products may refer to (final) spatial shapes of the final products designed or intended to be deployed, incorporated or assembled into an overall vehicle or non-vehicle system or product. Near-net-shapes of the final products may refer to spatial shapes that relatively closely approximate the final forms or net-shapes of the final products, for example as compared with one or more applicable shape similarity thresholds or error tolerances.

Example net-shapes or near-net-shape of final products may include, but are not necessarily limited to only, any of: 3D shapes with relatively small thickness; 3D shapes formed by two relatively large exterior contiguous non-planar surfaces with relatively small thickness in between the two exterior surfaces; complex spatial forms or shapes; non-complex spatial forms; sheets; regular or non-regular shapes; any combinations of the foregoing; etc. Example final products may include, but are not necessarily limited to only, vehicle or non-vehicle parts; interior or exterior parts of vehicle or non-vehicle systems; interior or exterior parts deployed within physical spaces of vehicles or non-vehicle systems; etc.

The composite preforms can be formed from a slurry with a relatively uniform spatial distribution of each material type (e.g., paper, natural, artificial, or other reinforcement fibers) and/or each length type (e.g., short, long, medium, etc.) of fiber materials and/or with a relatively uniform spatial distribution of a resin system, additives, sizing, and/or other constituents of the final composite. The composite preforms may, but are not necessarily limited to only, be composed of isotropic materials without any spatial directionality or polarity in physical properties. The composite preforms may be of relatively short natural or artificial fibers or relatively long natural or artificial fibers. In some operational scenarios, the composite preforms may include fibrous materials derived from recyclable materials such as paper and other recyclable or non-recyclable fiber types, as well as their mixture(s) including but not limited to mixture(s) of fibers of multiple different types. For example, the composite material used to create a composite preform as described herein may be a mixture of natural and polymer fibers. Different types of fibers may have their respective densities lighter or heavier than the density of the liquid such as water.

Example densities of fibers of different types may include, but are not limited to only, 0.92 gram/cm³, 1.50 gram/cm³, etc.

The manufacturing processes of composite preforms as described herein can be used to create a wide variety of complex and non-complex shapes composed of contiguous exterior surfaces forming a specific designed curved, bent, folded, or edge-joined surface that is not coplanar with a plane, sheet or flat surface. These shapes and/or sizes can be the same as or relatively closely approximate one or more specific surface portions of final shapes or net-shapes and/or sizes of final products. Hence, these processes can be used to generate composite preforms with relatively accurate spatial forms/geometries and sizes while reducing or minimizing energy consumption (e.g., reduced to approximately 50% or less, etc.) and time and material waste (e.g., less than 2, 5, 10% as compared with what incurred under other approaches, etc.).

In some operational scenarios, composite mixture preforms can be used as final products in various vehicle or non-vehicle product applications to replace final products of the same or similar net-shapes which would otherwise be manufactured using available state-of-the-art manufacturing processes. For example, composite preforms as described herein can be used to replace vehicle body panels manufactured under other approaches primarily out of materials such as steel and aluminum, plastics, carbon or glass fiber reinforced plastics, etc. Renewable and/or readily recycled resources such as paper-based composites can be relatively easily and efficiently used to significantly reduce carbon footprint associated with the final products produced under other approaches.

Example composite preforms or final products generated under techniques as described herein may include, but are not necessarily limited to only, any, some or all of: door map pocket, arm rest, complete door cards, other structures such as dashboards, and so on, for non-visible product applications. Additionally, optionally or alternatively, example composite preforms or final products as described herein may include, but are not necessarily limited to only: any, some or all of: natural fibers surface (e.g., including textured surfaces, coated surface, etc.), functionalized parts (e.g., touch and proximity sensor integration, light integration, etc.), exterior parts (e.g., body panels, robust trim parts, side-view mirror covers, door handles or pickup bed lining, etc.), and so on, for visible product applications. These composite preforms or final products generated under techniques as described herein may be attached to the vehicle body and/or other components through adhesive bonding, direct screwing, clipping, thermoplastic welding, or other suitable technologies. The joining surfaces might be created by the preform and composite manufacturing process or by additional function integration, such as back-injection molding.

Some or all of the composite preforms can be dent- or scratch-resistant, lightweight, made of sustainable materials, compatible with coating processes, tolerant or resistant to a wide range of temperatures or external forces with relatively high structural integrity, heat sealable, flame retardant, pill-resistant, tear-resistant, colored, and applied in a wide variety of industries including but not necessarily limited to only the automotive industry.

Example approaches, techniques, and mechanisms are disclosed for manufacturing (e.g., fiber-reinforced polymer, etc.) composite preforms. A liquid, a fibrous material and a binding material (e.g., resin, etc.) is mixed into a (e.g., homogeneous, etc.) slurry of a composite mixture of the fibrous material and the binding material in a slurry container. A porous tool having a specific outer surface portion that approximates a specific surface portion of a spatial shape of a final product is immersed in the slurry container. The specific outer surface portion of the porous tool is in part or in whole porous. While the porous tool is immersed in the slurry container, a suction pressure is applied to draw a portion of the fibrous material potentially but not necessarily intermixed with a corresponding portion of the binding material in the slurry of the composite mixture onto the specific outer surface portion of the porous tool to form a wet preform. The porous tool having the specific outer surface portion attached with the wet preform is removed from the slurry container. The wet preform attached to the specific outer surface portion of the porous tool is partially dried into a partially dried preform attached to the specific outer surface portion of the porous tool. After the partially dried preform is detached from the porous tool, the partially dried preform is dried, solidified and/or consolidated into a solid (e.g., fiber-reinforced polymer, etc.) composite preform of the spatial shape of the final product.

2.0. Wet Composite Preform

FIG. 1 illustrates example fiber mixing and preforming. One or more fibrous materials such as paper fibers can be first cut, chopped or otherwise reduced into relatively small pieces. The fibrous materials as reduced into the pieces below specific maximum spatial dimensions are then mixed with liquid such as water in a container 102 to achieve filamentization for a first time duration during which individual fibers embedded in the pieces of the fibrous materials are separated into loose fibers of relatively short lengths and dispersed throughout the liquid. A polymeric matrix or binder made of one or more thermoplastic or thermoset materials such as resin materials can be mixed with the loose fibers suspended in the liquid in the form of fibers, particles, as an emulsion or in solution with the liquid medium. These fibers are mixed in the liquid over a second time duration—which may be the same as the first time duration mentioned above or a different time duration—until a relatively homogeneous and/or relatively isotropic composite mixture slurry 104 with relatively uniform spatial distribution(s) of fiber density and/or resin density is created in the container 102. The same slurry may contain other materials to improve or modify the final product, or to improve processing, such as but not limited to: additives, binders, sizing, etc.

The slurry 104 can be continuously agitated with an agitator 108 disposed or immersed in the slurry 104 in the container 102. In some applications an agitator might not be necessary, or the agitation can be performed by the continuous or discontinuous inlet of the slurry or other liquid medium into the slurry bath. As a result, even where relatively heavy fibers and/or other types of materials present in the composite mixture of the slurry 104 have densities higher than that of the liquid, these fibers and/or materials can be prevented from sinking down to the bottom of the container 102. Likewise, even where relatively light fibers and/or other types of materials present in the composite mixture of the slurry 104 have densities lower than that of the liquid, these fibers and/or materials can be prevented from concentrating at the top of the container 102. Hence, regardless of whether fibers and/or materials in the slurry 104 have a higher or lower density than that of the liquid in the slurry 104, these fibers and/or materials can remain suspended the slurry 104 relatively homogeneous and spatially uniform with no or little density differences among different spatial regions of the slurry 104, thereby giving rise to an overall relatively homogeneous and spatially uniform composite mixture in a liquid or slurry form.

A porous tool 106 having a specific outer or exterior surface portion 112 (e.g., the upper surface of a solid black shape in FIG. 1, etc.) that relatively closely approximates a specific outer or exterior surface portion—e.g., which shares the same surface contour as the specific outer or exterior surface portion 112 of the porous tool—of a final spatial shape (and/or size) of a final product is immersed into the slurry 104. As used herein, "a final product" refers to a product that assumes a final spatial shape (as designed) to be assembled or incorporated into a larger system or product such as a vehicle or non-vehicle system or product.

In some operational scenarios, the specific outer or exterior surface portion 112 of the porous tool 106 is specifically designed and made in reference to the specific outer or exterior surface portion of the final product for the purpose of relatively closely approximating the specific outer or exterior surface portion of the final product. A design goal for the specific outer or exterior surface portion 112 of the porous tool 106 can be achieved by minimizing material waste generated from subsequent precision shaping of a preform generated with the porous tool 106 below a specific material waste prevention threshold (e.g., no more than 1%, 5%, 10%, etc., of the total material constituting the final product, etc.). In some operational scenarios, preforms generated under techniques as described herein can be subsequently solidified into corresponding final products without cutting or bending sheets of composite materials. Hence, under these techniques, both material waste and subsequent manufacturing can be minimized.

The specific outer or exterior surface portion 112 of the porous tool 106 may be specifically designed and made in reference to the corresponding outer or exterior surface portion of the final spatial shape (and/or size) of the final product to approximate relatively closely the corresponding outer or exterior surface portion of the final product. Spatial features (e.g., surfaces, spatial structures, contours, etc.) of a preform generated with the porous tool 106 inherit or substantially replicate the same spatial features of the specific outer or exterior surface portion 112 the porous tool 106. Once the preform is subsequently tried and solidified, no or little further cutting is needed to conform the preform into designated spatial features of the corresponding outer or exterior surface portion of the final product, for example within a specific error tolerance or precision (e.g., no more than 1%, 5%, 10%, etc., errors or deviations as compared with the overall size of the final product, etc.).

As shown in FIG. 1, vacuum or negative pressure 110 may be applied to an upper side or surface of—the interior volume of—the porous tool 106 to draw or suck a portion of the slurry 104 from outside the porous tool 106 toward the specific outer or exterior surface portion 112 of the porous tool 106. The pores may be designed or implemented to be relatively fine to allow liquid—in the portion of the slurry 104 drawn by the vacuum or negative pressure 110—to pass through the specific outer or exterior surface portion 112 of the porous tool 106 into the interior volume of the porous tool 106 but prevent most if not all loose fibers—in the portion of the slurry 104 drawn by the vacuum or negative pressure 110—from passing through the same specific outer or exterior surface portion 112. As a result, the loose fibers in the portion of the slurry 104 stay outside the porous tool 106, and get accumulated, trapped and attached at or next to the specific outer or exterior surface portion 112 of the porous tool 106. These loose fibers are distributed over the (e.g., entire, etc.) specific outer or exterior surface portion 112 of the porous tool 106 to form a wet preform of an intended thickness and/or of a complex shape. For the purpose of illustration only, the wet preform is represented by a solid black shape illustrated in FIG. 1.

It should be noted that, in various operational scenarios, intended thicknesses for wet preforms as described herein may vary depending on some or all of: specific applications of corresponding final products, specific composite mixtures, specific fiber types or reinforcing material types, specific binding materials used to produce the preforms, etc.

The liquid passing through the specific outer or exterior surface portion 112 into the interior volume of the porous tool 106 may be expelled from the interior volume of the porous tool 106, for example through exiting out of one or more surfaces of the porous tool 106 such as side surfaces of the porous tool 106. In an example, the liquid accompanying the fibers accumulated at the surface portion 112 may flow out of the porous tool 106 from the surface portion 112. In another example, the liquid may flow out of the porous tool 106 from side surface portions of the porous tool 106. In yet another example, the liquid may flow out of the porous tool 106 from the upper surface portion of the porous tool 106.

The wet preform thus formed with the porous tool 106 has a corresponding specific surface portion—e.g., the upper surface portion of the solid black shape of FIG. 1—that inherits or substantially replicate (e.g., entirely, with small error tolerances, etc.) some or all of the spatial features of the specific outer or exterior surface portion 112 of the porous tool 106.

A wide variety of porous tools can be designed or made based on some or all spatial features including but not limited to surfaces of various final products. Different porous surfaces, pore distributions, pore sizes, etc., may be implemented on a porous tool such as on a specific outer or exterior surface approximating a specific outer or exterior surface of a final product. For example, spatial sizes (e.g., sub-millimeter size, millimeter size, sub-centimeter size, etc.) and distributions of the pores on the surface 112 of the porous tool 106 may be specifically selected or determined to maximize efficiency and effectiveness in letting liquid through into the interior volume of the porous tool 106 but retaining and accumulating fibers in the slurry 104 at or next to the surface 112 on the other side of the interior volume of the porous tool 106. Each of the pore sizes may be much (e.g., 5 times, 10 times, etc.) smaller than an average or smaller diameter of the fibers in the container 102. For example, in some operational scenarios, fiber diameter may be in the range of few tens of microns, while pore or hole size is in the 500-1000 micron size range. In a non-limiting example, the spatial sizes and distributions of the pores can be determined through simulation or modeling. Additionally, optionally or alternatively, the spatial sizes and distributions of the pores can be determined through simulation and/or empirical measurements/studies/validations.

The porous (or slurry) tool 106 may, but is necessarily limited to only, be composed in whole or input of parts that are made with 3D printing using plastics (e.g., conventional plastics, etc.) and/or non-plastic materials. For example, a uniform or homogeneous material such as conventional plastics may be used to create some or all parts of the porous tool 106. These parts can be used to form a rigid or semi-rigid (but porous) structure constituting the porous tool 106.

The porous tool 106 may be entirely or partly (e.g., 60%, 70%, 80%, 90% or more, etc.) formed by porous surfaces on which pores are spatially distributed. Additionally, optionally or alternatively, the porous tool 106 may be a rigid or semi-rigid structure that includes non-porous surface portions (on which no pores are made) along with the porous surfaces. In some operational scenarios, the upper surface of the porous tool 106 is not porous. In some operational scenarios, only the specific surface portion 112 of the porous tool 106 is porous, whereas other surface portions of the porous tool may or may not be porous.

Additionally, optionally or alternatively, the porous tool 106 may be one or more openings (e.g., centimeter size, multi-centimeter size, to which a tube of a vacuum pump may be removably attached or in contact. The vacuum pump may be removably attached or in contact with the porous tool 106 on the upper surface portion of the porous tool 106 alone or from one or more side surface portions of the porous tool 106.

The vacuum pump may apply vacuum or negative pressure directly to liquid in the interior volume of the porous tool 106 and indirectly to the slurry 104 in the container 102 through the openings of the porous tool 106. The vacuum pump may be specifically configured with other components of FIG. 1 such that a relative even, homogeneous and/or constant spatial distribution of force per unit area or pressure/under-pressure is generated or induced over some or all of the surface portion 112 of the porous tool 106 in operation. The strength of vacuum pull generated by the vacuum pump may be controlled, selected or optimized to keep the already accumulated loose fibers attached to the surface portion 112 of the porous tool 106 until the wet preform of the specific thickness is formed. Additionally, optionally or alternatively, the strength of vacuum pull generated by the vacuum pump may be controlled, selected or optimized to cause the liquid passing through specific surface portion 112 of the porous tool 106 within a specific speed or velocity range, for example not exceeding a maximum speed/velocity threshold supported by a maximum rate of liquid dispersal from the porous tool 106.

Once the fibers (in a composite mix with attendant or bond portions of the thermoplastic or thermoset materials) attached to the surface 112 of the porous tool are accumulated to a specific thickness, the porous (or slurry) tool 106 can be lifted or removed from the container 102. The fibers (in a composite mix with attendant or bond portions of the thermoplastic or thermoset materials) that remain attached to the surface 112 of the porous tool 106 constitute a wet (composite mixture, or fiber reinforcement) preform for the final product.

Suction, vacuum or negative pressure can be applied to dry the wet preform attached to the porous tool 106 to a specific level of partial dryness that support handling without breaking up or deforming the composite preform after being freed from the porous tool 106. Additionally, optionally or alternatively, heated or unheated air can be applied or circulated over a time duration to cause at least a part of liquid inside the wet preform attached to the porous tool 106 to evaporate.

Subsequently after the wet composite preform is dried to the specific level of partial dryness, the suction, vacuum or negative pressure can be shut off, and (e.g., positively, higher than ambient pressure level, etc.) pressurized air is blown through the porous surfaces of the porous tool 106 to force or loosen the partially dried composite preform off (the surface 112) of the porous tool 106 and onto a receiving porous or non-porous surface, preferably of the same spatial shapes as the surface 112 of the porous tool 106.

In some operational scenarios, the composite mix slurry 104 in the container 102 including (e.g., short, etc.) fibers suspended in the liquid may be agitated with an agitation device 108 in the container 102 during preform formation, for the purpose of preventing or avoiding fiber separation due to (fiber) density differences in different spatial regions within the porous tool 106 or the container 102. The agitation device may be of a rotational type, or a specific non-rotational device to avoid fiber orientation, or could be based on a stream of liquid (slurry or water or other liquid) introduced to the slurry tank. In this latter case the agitation system would have no moving parts, but could be configured by the orientation location and shape of the inlet valve/opening, as well as by geometrical features included in the tank to direct or re-direct the flow. This allows a uniform or relatively uniform distribution of each type of the fibrous materials used in the slurry 104 outside the porous tool 106. This may be useful especially in operational scenarios in which fibers of varying densities are mixed in the composite slurry 104 in the container 102.

Additionally, optionally or alternatively, the method of agitation as described herein may be specifically selected and used to create isotropic orientation for fibers and avoid creating a distinct fiber orientation or other unintended internal structural patterns or unevenness.

The foregoing operations may be repeated to create additional wet and then partially dried (composite mixture) preforms with the same porous tool 106, another porous tool with the same as or a different designed exterior surface as the specific surface 112, a different porous tool with a different spatial shape and/or a different size, etc.

3.0. Dry Composite Preform

Figure 2:
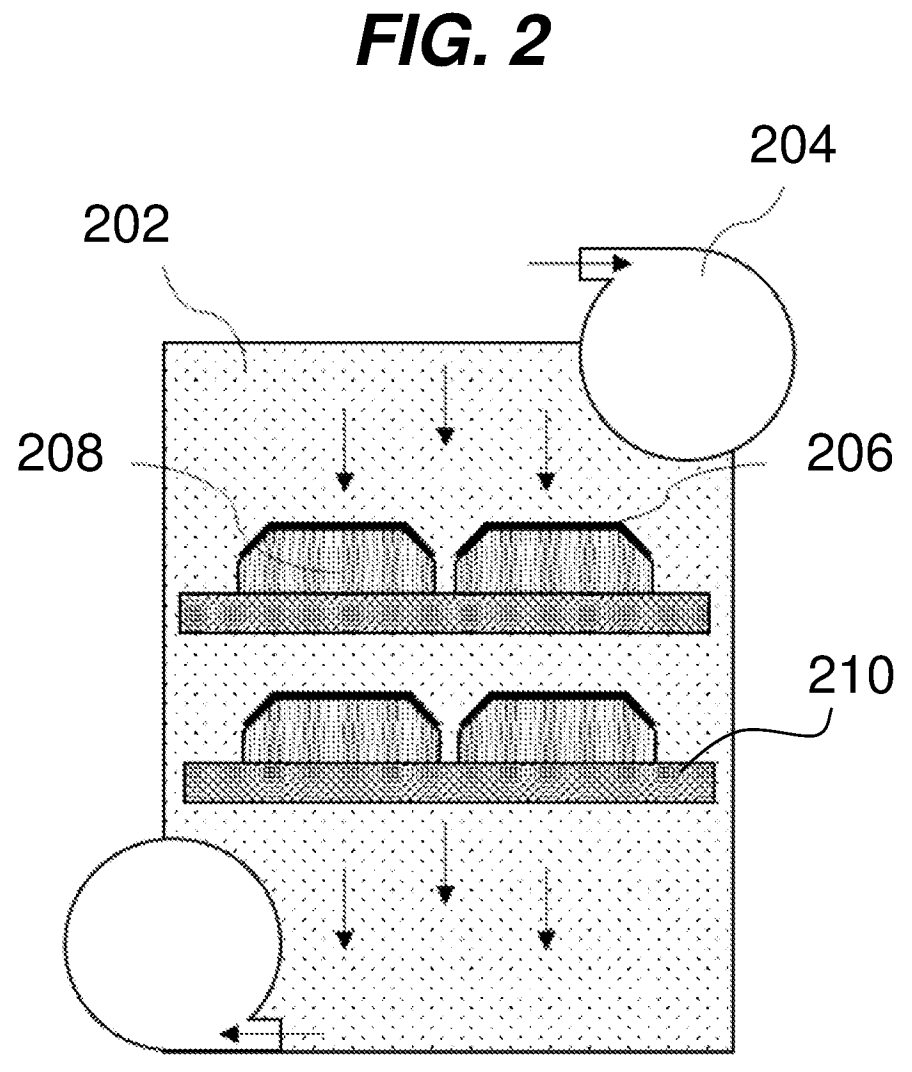

FIG. 2 illustrates example operations of drying or removing moisture/liquid from composite (mixture, or fiber reinforcement) preforms to complete dryness or a relatively high level (e.g., 99.9%, 99.99%, a higher percentile, etc.) of dryness.

As shown, one or more composite mixture preforms 206 such as wet or partially dried preforms detached from porous tool(s) 106 or the like may be placed on one or more loading/unloading structures 210 inside an enclosed environment 202. The rigid structures 210 may be used as stations, receiving surfaces or shelves for loading the wet or partially dried preforms detached from the porous tool(s) 106 at a relatively low height in the enclosed environment 202. The preforms loaded on the rigid structures 210 may be (e.g., slowly but continually, etc.) dried into a dried (composite mixture, or fiber reinforcement) preform 206 while the rigid structures 210 is being raised, elevated or moved to a specific (higher) height in the enclosed environment 202 before existing the enclosed environment for unloading.

A preform 206 may have a first exterior surface that is the same as the specific surface 112 of the porous tool 106 and a second exterior surface opposite to the first exterior surface. The fibers and other attendant materials in the composite mixture are sandwiched between these two opposite exterior surfaces. In some operational scenarios, the second exterior surface of the preform 206 may be similar to the first exterior surface that was previously in contact with the specific surface 112 of the porous tool 106.

As shown in FIG. 2, an overall spatial shape of the rigid structure 210 may not be planar. The rigid structure 210 may include a spatial volume or sub-structure 208 that has an exterior surface portion that is the same as or substantially similar to the second exterior surface of the preform 206. As noted, in some operational scenarios, the second exterior surface of the preform 206 may be the same as or substantially similar to the first exterior surface of the preform 206.

The enclosed environment 202 may, but is not necessarily limited to only, be an interior space, a heated chamber or a kiln of a drying oven such as a paternoster oven 202 as illustrated in FIG. 2. Dry, heated air is forced through the preforms 206 and the loading/unloading structures 210 in the enclosed environment 202. One or more blowing motors 204 may be specially selected, placed and/or laid out at or around specific locations of boundaries of walls surrounding or demarcating the enclosed environment 202, to allow for or produce (e.g., entirely, mostly, substantially, etc.) air flows through the composite preforms 206, for example in a downward direction, to avoid deforming the preforms 206. The loading/unloading structures 210 on which preforms are placed may be porous to allow the air flow to pass.

In some operational scenarios, a loading/unloading structure 210 as described herein may move from the bottom of the enclosed environment 202 (or interior of the oven) towards the top of the enclosed environment 202 (or interior of the oven). A loading/unloading structure 210 that receives the wet or partially dried composite preforms 206—as freed from the porous tool 106 of FIG. 1—enters the enclosed environment 202 (or interior of the oven) on the bottom; moves from the bottom of the enclosed environment 202 (or interior of the oven) towards the top of the enclosed environment 202 (or interior of the oven) as the preforms 206 are being dried; and exits on or from the enclosed environment 202 (or interior of the oven) on the bottom after the moisture/liquid is removed from the preforms 206 and become dried to complete dryness or the relatively high level of dryness.

For the purpose of illustration only, it has been described that wet or partially dried preforms can be dried in a paternoster oven. It should be noted, in other operational scenarios, other ovens other than paternoster oven such as microwaves may be used for preform drying purposes. In some operational scenarios, non-oven drying methods may also be used to vaporize and driving out liquid from preforms, thereby drying the preforms to complete dryness or a relatively high level of dryness.

4.0. Solidify Composite Preform

Figure 3:
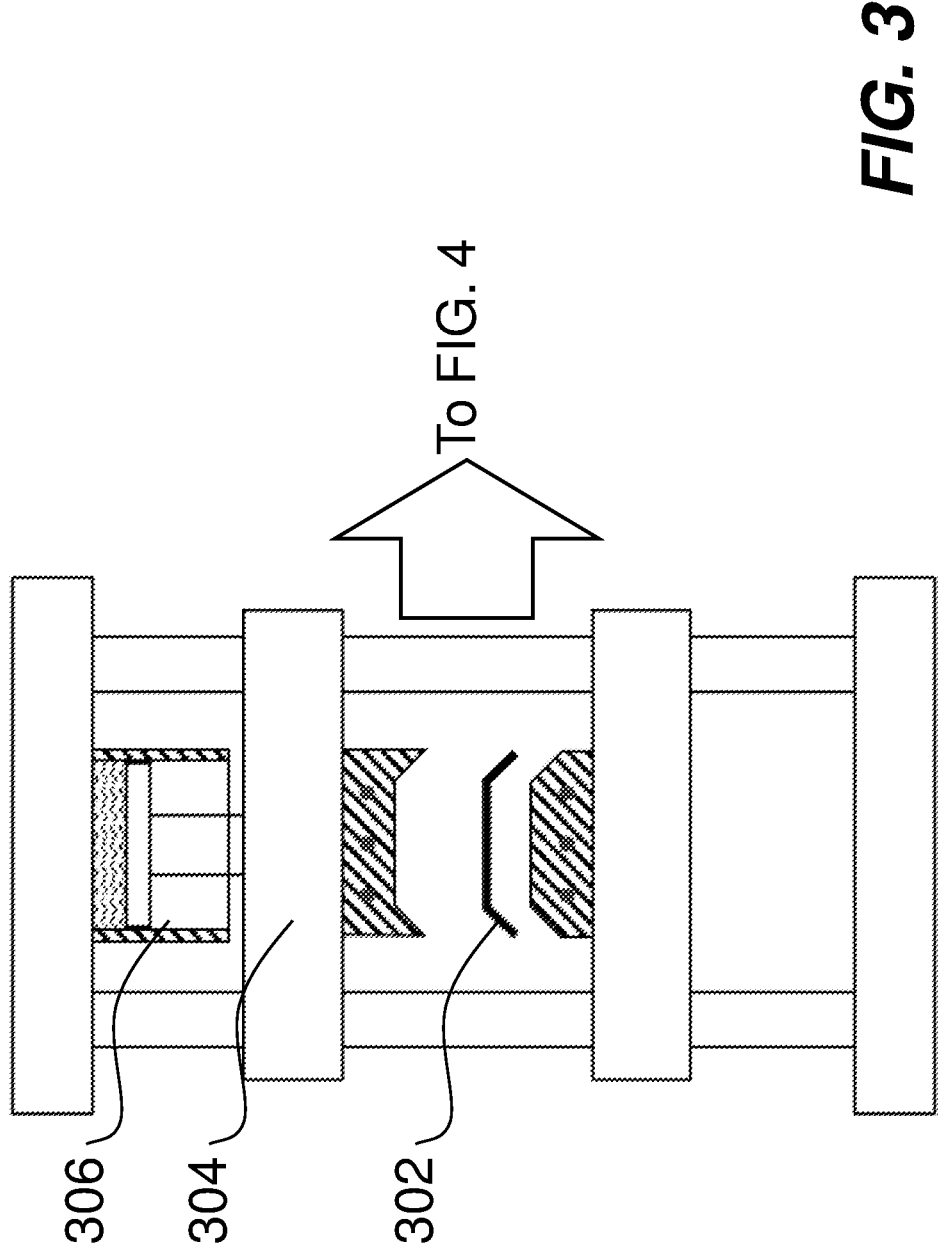
FIG. 3 and FIG. 4 illustrate example consolidating or solidifying dried composite mixture preforms.
Figure 4:
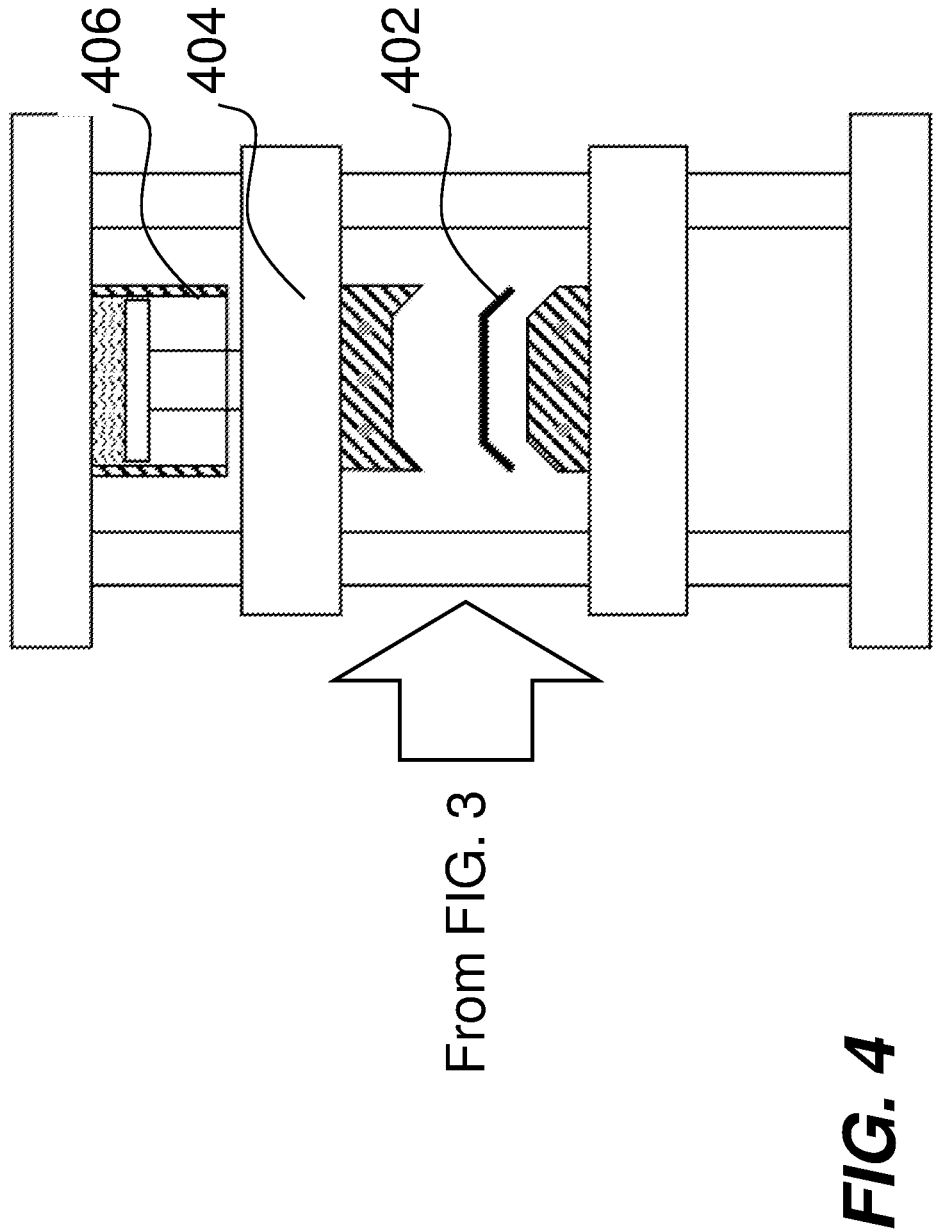

FIG. 3 and FIG. 4 illustrate example consolidating or solidifying dried composite (mixture) preforms into final preforms.

As illustrated in FIG. 3, a dried preform 302—as dried from the method or process flow illustrated in FIG. 2—may be placed or (e.g., completely, etc.) enclosed into a first mold 304. The first mold 304 is then heated to a first temperature, and pressure 306 may also be applied to the preform 302 in the first mode 304.

By way of example but not limitation, in some operational scenarios in which thermoplastic materials such as resin fibers are used in the preform, the first temperature may be slightly (e.g., 0.5 Celsius degree, 1 Celsius degree, 2 to 5 Celsius degrees, below a degradation temperature for fiber, etc.) above the melting point(s) or crystallization temperature(s) of the resin and/or fibers. Heating at the first temperature and/or pressure 306 may be applied for a specific time duration to completely melt the thermoplastic fibers/materials (e.g., resin, etc.) of the preform 302 in the first mold 304 into a molten preform.

The molten preform 402 can then be mechanically or robotically transferred to a cold consolidation tool or a second mold 404 as shown in FIG. 4. Alternatively, the temperature of the tooling 304 can be decreased below the melting point of the thermoplastic material to consolidate the molten preform 402. This second mold 404 can be heated or cooled from a temperature above the melting point(s) or crystallization temperature(s) of the resin and/or fibers to a second temperature below the melting point(s) or crystallization temperature(s) of the resin and/or fibers, and pressure 406 may also be applied to the preform 402 in the second mode 404.

The second temperature may be set or selected based at least in part on the composite mixture or specific materials (e.g., PET materials, etc.) included therein. By way of example but not limitation, in some operational scenarios in which thermoplastic materials such as resin fibers are used in the preform, the second temperature may be set to be (e.g., 2 to 5 Celsius degrees, 5 to 20 Celsius degrees, etc.) below the melting point(s) or crystallization temperature(s) of the resin and/or fibers of the preform so that the molten preform 402 can solidify or consolidate in a relatively smooth manner that does not adversely impact intended material or physical structures in the preform.

Additionally, optionally or alternatively, some or all interior surfaces of the cold consolidation tool or the second mold—used to enclose the preform—can be textured to impart a specific texture or pattern to some or all exterior surfaces of the solidified or consolidated composite preform. Additionally, optionally or alternatively, stamping or other finishing steps may be performed as a part of, or subsequent to, the solidifying or consolidating process flow of FIG. 3 and FIG. 4.

As used herein, a composite mixture refers to a material that is a microscopic or macroscopic combination of two or more distinct materials with a recognizable interface between them. The composite mixture can be used to produce composite mixture preforms and/or final products with specific structural, strength, heat resistance, and/or other mechanical, physical or chemical properties or characteristics for a variety of vehicle or non-vehicle product applications.

For the purpose of illustration only, it has been described that loose fibers such as relatively short loose fibers may be used as a strength reinforcing material to mix with a binder or matrix material such as a thermoplastic or thermoset material in liquid to create the composite mixture. It should be noted that, in other operational scenarios, some or all techniques as described herein can be implemented or modified to use other strength reinforcing materials such as particles (e.g., fiber particles, non-fiber particles, etc.) in addition to or in place of using loose fibers.

5.0. Example Embodiments

Figure 5A:
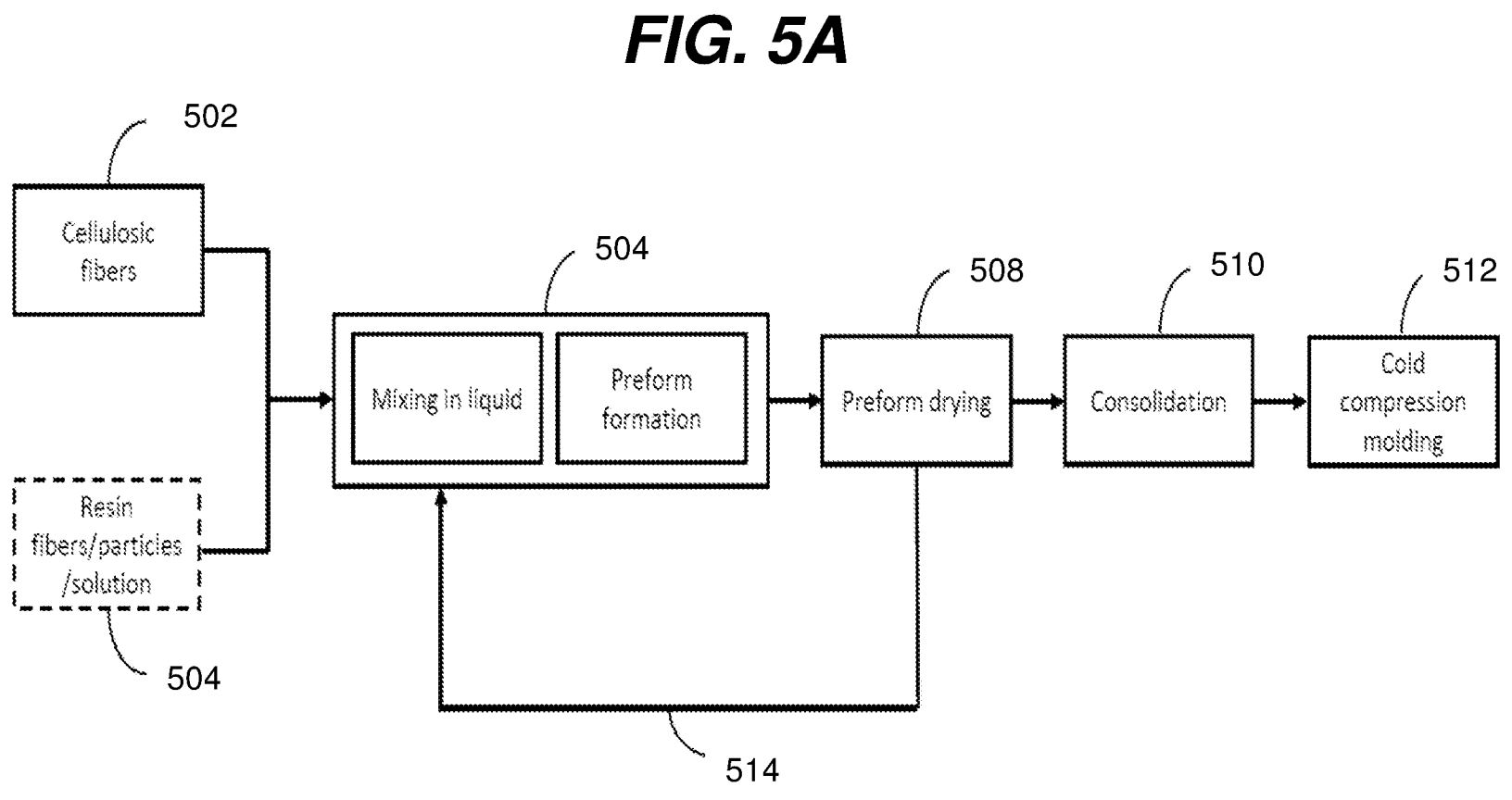

FIG. 5A illustrates an example (e.g., continuous, repeatable, etc.) process flow for producing fiber-reinforced composite preforms with specific spatial features of final products. In block 502, a fibrous material such as natural and/or cellulosic fibers other reinforcing fibers, glass and/or carbon fibers used for reinforcement are prepared into a composite mixture. In block 504, a binding material such as a polymer resin, in the form of particles, fibers, flakes, or in solution, used as a composite matrix, can be prepared. In block 506, the fibrous material and potentially the binding material are mixed in a liquid such as water in a container (e.g., 102 of FIG. 1, etc.) into a slurry of a composite mixture of the fibrous material and the binding material. The slurry of the composite mixture may be continuously agitated to create and maintain a relatively homogenous and spatially uniform distribution of each of multiple types of component materials present in the slurry. A portion of the slurry is drawn or pull to a specific surface of a porous tool immersed in the container to form a wet preform. In block 508, the wet preform or a partially dried preform generated from partially drying the wet preform may be transported on a conveyor belt into an oven and dried into a dried preform. In block 510, the dried preform (e.g., made of thermoplastic fibers, etc.) may be heated, melted and consolidated into a molten preform (e.g., molten thermoplastic fibers, etc.). In block 512, the molten preform is frozen or molded, for example through cold compression molding, into a final shape with a specific surface portion closely approximating a specific surface of a final product. In some operational scenarios, material wastes such as cut-off or scrap generated in any or all foregoing or subsequent steps can be recycled. For example, some or all composite mixture wastes generated in block 508 prior to consolidation may be cut, loosened, mixed in liquid, and recycled back (514 of FIG. 5A) into the composite mixture in the slurry used to make wet preforms.

Additionally, optionally or alternatively, in some operational scenarios, the foregoing preform manufacturing process flow can be integrated with a (e.g., thermoplastic material, etc.) back injection molding process or a non-back-injection molding process (e.g., an abrasive bonding process, a thermoplastic variegating process, a coating process, a painting process, etc.). In addition, some or all material wastes generated in such molding process may be shredded, ground, compounded and recycled back as input to the same molding or preforming process.

FIG. 5B illustrates another (e.g., continuous, repeatable, etc.) example process flow for producing fiber-reinforced composite preforms with specific spatial features of final products. In block 552, a liquid, a fibrous material, a binding material (e.g., resin, etc.), and potentially other materials and additives (e.g., fire retardants, sizing systems, functional additives, etc.) is mixed into a (e.g., homogeneous, etc.) slurry of a composite mixture of the fibrous material and the binding material in a slurry container. In block 554, a porous tool having a specific outer surface portion that approximates a specific exterior surface portion of a spatial shape of a final product is immersed in the slurry container. The specific outer surface portion of the porous tool is at least partially porous. In block 556, while the porous tool is immersed in the slurry container, a suction pressure is applied to draw a portion of the fibrous material intermixed with a corresponding portion of the binding material in the slurry of the composite mixture onto the specific outer surface portion of the porous tool to form a wet preform. In block 558, the porous tool having the specific outer surface portion attached with the wet preform is removed from the slurry container. In block 560, the wet preform attached to the specific outer surface portion of the porous tool is partially dried into a partially dried preform attached to the specific outer surface portion of the porous tool. In block 562, after the partially dried preform is detached from the porous tool, the partially dried preform is dried, solidified and/or consolidated into a solid (e.g., fiber-reinforced polymer, etc.) composite preform of the spatial shape of the final product.

In an embodiment, the fibrous material is first chopped to generate relatively short (e.g., 0.5 mm, 3 mm, 25 mm, etc.) fiber segments and then mixed in the liquid with the binding material.

In an embodiment, sizes of pores (e.g., 0.25 mm², 0.5 mm², 2 mm², etc.) located in the specific outer surface of the porous tool are specifically selected among a plurality of candidate sizes (a) to allow liquid to pass through the specific outer surface of the porous tool, and (b) to further allow heated air to be blown through the pores to partially dry off the wet preform into the partially dried preform.

In an embodiment, the porous tool includes a solid plastic or metallic tool created at least in part through a 3D printing process.

In an embodiment, the slurry of the composite mixture in the container is continuously agitated to reduce or prevent fiber density differences in different volume portions in the slurry container, excluding a specific volume portion of the wet preform attached to the porous tool and a specific interior volume of the porous tool.

In an embodiment, the fibrous material in in the tool spatial volume of the porous tool is isotropic in spatial directions.

In an embodiment, the partially dried preform detached from the porous tool is placed in an enclosed environment, and a laminar flow of heated air in the enclosed environment is forced through the partially dried preform to create a dried preform.

In an embodiment, the enclosed environment represents an interior environment of a paternoster oven.

In an embodiment, the dried preform is placed in a first heated mold for a first time duration to allow the composite mix in the dried preform to (e.g., completely, partially, etc.) melt into a molten preform. The molten preform of the composite mix is placed in a second heated mold for a second time duration to allow the molten preform to solidify into the composite preform.

In an embodiment, the first heated mold is heated to a first temperature above a melting temperature of the composite mix; the second heated mold is heated to a second temperature below the melting temperature of the composite mix.

In an embodiment, the solid composite preform is created, starting at least from the slurry of the composite mixture, without any sheet cutting operations.

In an embodiment, pores of the porous tool have one of: circular shapes, or non-circular shapes.

In an embodiment, the fibrous material represents one of: a paper material, a recyclable fibrous material, a natural fiber material, or another type of fibrous or flaked material; wherein the binding material represents one of: a resin, a thermoset resin, or a thermoplastic resin.

In an embodiment, the thermoset resin comprises one of a phenolic, epoxy, unsaturated polyester, vinyl ester, polyurethane or polyimide resin; wherein the thermoplastic resin comprises one of a polypropylene, polyethylene, polyethylene terephthalate, polycarbonate, acrylonitrile butadiene styrene, polyamides or polystyrene resin.

According to one embodiment, a composite preform assembly, comprising: a slurry container; a liquid, a fibrous material and a binding material that are mixed into a slurry of a composite mixture of the fibrous material and the binding material in the slurry container; a porous tool that has a specific outer surface portion that approximates a specific exterior surface portion of a spatial shape of a final product and is at least partially porous. While the porous tool is immersed in the slurry container, a suction pressure is applied to draw a portion of the fibrous material intermixed with a corresponding portion of the binding material in the slurry of the composite mixture onto the specific outer surface portion of the porous tool to form a wet preform. After the porous tool is removed from the slurry container, the wet preform attached to the specific outer surface portion of the porous tool is partially dried into a partially dried preform attached to the specific outer surface portion of the porous tool. After the partially dried preform is detached from the porous tool, the partially dried preform is dried and solidified into a solid composite preform of the spatial shape of the final product.

In an embodiment, the composite preform assembly further comprises: an enclosed environment in which the partially dried preform detached from the porous tool is placed; one or more blowers that force a laminar flow of heated air in the enclosed environment through the partially dried preform to create a dried preform.

In an embodiment, the composite preform assembly further comprises: a first heated mold in which the dried preform is placed for a first time duration to allow the composite mix in the dried preform to melt into a molten preform; a second heated mold in which the molten preform of the composite mix is placed for a second time duration to allow the molten preform to solidify into the composite preform.

In another embodiment, the fiber reinforcement preforms are placed into a closed or open mold to be injected or otherwise impregnated with a liquid or porous resin, to be cured or consolidated in a subsequent step, creating a solid composite.

Other examples of these and other embodiments are found throughout this disclosure. Note that, although separate embodiments are discussed herein, any combination of embodiments and/or partial embodiments discussed herein may be combined to form further embodiments.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for manufacturing composite or fiber reinforcement preforms, comprising:

mixing a liquid, a fibrous material and a binding material into a slurry of a composite mixture of the fibrous material and the binding material in a slurry container;

immersing, in the slurry container, a porous tool having a specific outer surface portion that approximates a specific surface portion of a spatial shape of a final product, the specific outer surface portion of the porous tool being at least partially porous;

while the porous tool is immersed in the slurry container, applying a suction pressure to draw a portion of the fibrous material intermixed with a corresponding portion of the binding material in the slurry of the composite mixture onto the specific outer surface portion of the porous tool to form a wet preform;

removing, from the slurry container, the porous tool having the specific outer surface portion attached with the wet preform;

partially drying the wet preform attached to the specific outer surface portion of the porous tool into a partially dried preform attached to the specific outer surface portion of the porous tool, wherein the wet preform is partially dried to a specific level of partial dryness to produce the partially dried preform before the partially dried preform is detached from the porous tool; and after detaching the partially dried preform from the porous tool, performing:

drying the partially dried preform to produce a dried preform;

melting the corresponding portion of the binding material contained in the dried preform; and solidifying the dried preform produced from the partially dried preform into a solid composite preform of the spatial shape of the final product.

2. The method of claim 1, wherein the fibrous material is first chopped to generate relatively short fiber segments and then mixed in the liquid with the binding material.

3. The method of claim 1, wherein the sizes of pores located in the specific outer surface of the porous tool are specifically selected among a plurality of candidate sizes (a) to allow liquid to pass through the specific outer surface of the porous tool, and (b) to further allow heated air to be blown through the pores to partially dry off the wet preform into the partially dried preform.

4. The method of claim 1, wherein the porous tool includes a solid plastic tool created at least in part through an additive manufacturing process.

5. The method of claim 1, wherein the slurry of the composite mixture in the container is continuously agitated to reduce or prevent fiber separation in different volume portions in the slurry container driven by density differences, excluding a specific volume portion of the wet preform attached to the porous tool and a specific interior volume of the porous tool.

6. The method of claim 1, wherein the fibrous material in in the tool spatial volume of the porous tool is isotropic in spatial directions within the surface formed by the porous tool.

7. The method of claim 1, further comprising:

placing the partially dried preform detached from the porous tool in an enclosed environment;

forcing a flow of heated air in the enclosed environment through the partially dried preform to create a dried preform.

8. The method of claim 7, wherein the enclosed environment represents an interior environment of a paternoster oven.

9. The method of claim 7, further comprising:

placing the dried preform in a first heated mold for a first time duration to allow the composite mix in the dried preform to melt into a molten preform;

placing the molten preform of the composite mix in a second heated mold for a second time duration to allow the molten preform to solidify into the composite preform.

10. The method of claim 9, wherein the first heated mold is heated to a first temperature above a melting temperature of the composite mix; wherein the second heated mold is heated to a second temperature below the melting temperature of the composite mix.

11. The method of claim 1, wherein the solid composite preform is created, starting at least from the slurry of the composite mixture, without any sheet cutting operations.

12. The method of claim 1, wherein the fibrous material includes at least one of: a paper material, a recyclable fibrous material, a natural fiber material, or another type of fibrous material; wherein the binding material represents one of: a resin, a thermoset resin, or a thermoplastic resin.

13. The method of claim 12, wherein the thermoset resin comprises one of a phenolic, epoxy, unsaturated polyester, vinyl ester, polyurethane or polyimide resin; wherein the thermoplastic resin comprises one of a polypropylene, polyethylene, polyethylene terephthalate, polycarbonate, acrylonitrile butadiene styrene, polyamides or polystyrene resin.

\* \* \* \* \*